(12) United States Patent
Offergeld et al.

(10) Patent No.: US 12,149,085 B1
(45) Date of Patent: Nov. 19, 2024

(54) BIPOLE POWER TRANSMISSION SCHEMES

(71) Applicant: GE INFRASTRUCTURE TECHNOLOGY LLC, Greenville, SC (US)

(72) Inventors: Markus Andre Offergeld, Constance (DE); Ajay Koliwad, Oreland, PA (US); Madhusudan Nandula, Stafford (GB); Neil Cuthbert, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/352,732

(22) Filed: Jul. 14, 2023

(51) Int. Cl.
*H02J 3/36* (2006.01)
*H02J 3/18* (2006.01)
*H02J 3/38* (2006.01)

(52) U.S. Cl.
CPC ..................................... *H02J 3/36* (2013.01)

(58) Field of Classification Search
CPC ......... Y02E 60/60; H02J 3/36; H02J 2300/28; H02J 3/381; H02J 3/001; H02J 3/00125; H02J 3/40; H02J 1/08; H02H 1/0007; H02H 3/05; H02H 7/1216; H02H 7/125; H02H 7/1255; H02H 7/268; H02H 7/1203; H02M 1/0009; H02M 1/32; H02M 5/4585; H02M 7/00; H02M 7/32; H02M 7/42; H02M 7/54; H04B 7/08
USPC ............................................................ 307/82
See application file for complete search history.

(56) References Cited

U.S. PATENT DOCUMENTS

| | | |
|---|---|---|
| 2018/0366942 A1 | 12/2018 | Gupta et al. |
| 2021/0249864 A1 | 8/2021 | Upadhyay |
| 2023/0082909 A1 | 3/2023 | Barker et al. |
| 2023/0140103 A1* | 5/2023 | Babu Narayanan .... H02J 3/381 307/82 |
| 2023/0223759 A1 | 7/2023 | Babu Narayanan et al. |

\* cited by examiner

*Primary Examiner* — Elim Ortiz
(74) *Attorney, Agent, or Firm* — Eversheds-Sutherland (US) LLP

(57) ABSTRACT

A bipole power transmission scheme includes at least a first converter station that is positioned in-use separate from at least a second converter station. The bipole power transmission scheme also includes at least first and second transmission conduits and a first return conduit to in-use interconnect the first converter station with the second converter station and thereby permit the transfer of power between the first and second converter stations.

16 Claims, 3 Drawing Sheets

BIPOLE POWER TRANSMISSION SCHEMES

TECHNICAL FIELD

This invention relates to a bipole power transmission scheme and to a method of operating such a scheme.

BACKGROUND

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e., the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e., power converters) are required at each interface between AC and DC power to affect the required conversion from AC to DC or from DC to AC.

The choice of the most suitable HVDC power transmission scheme within a HVDC power transmission network differs, depending on the application and scheme features. One type of such scheme, i.e., network configuration, is a bipole power transmission scheme which can include two terminal, two terminal dual (i.e., parallel bipole), and four terminal configurations.

SUMMARY

According to a first aspect of the invention there is provided a bipole power transmission scheme comprising at least a first converter station positioned in-use separate from at least a second converter station, and at least first and second transmission conduits and a first return conduit to in-use interconnect the first converter station with the second converter station and thereby permit the transfer of power between the first and second converter stations, the first converter station including:
a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
a first digital controller running an active instance of the first converter control function;
a second digital controller running a standby instance of the first converter control function;
a third digital controller running an active instance of the second converter control function; and
a fourth digital controller running a standby instance of the second converter control function,
one of the first, second, third and fourth digital controllers additionally running an active instance of a first converter station control function which generates station control data to control operation of the first converter station, and
one of the first, second, third and fourth digital controllers additionally running an active instance of a master power control function which in-use generates power control data to in-use control the power exchanged by the first converter station.

Having respective pairs of digital controllers, i.e. the first and second digital controllers, and the third and fourth digital controllers, run active and standby instances of the corresponding first or second converter control function desirably provides the necessary a degree of redundancy in the control of the first and second power converters which is mandated by operators of the associated bipole power transmission scheme.

Meanwhile, additionally implementing an active instance of the first converter station and master power control functions, i.e. running active instances of such further control functions, on one more of the digital controllers desirably minimises the deployment of additional controller hardware to run such functions, e.g. avoids the need for a further digital controller, within the first converter station, and thereby reduces the space occupied by the first converter station. Such space saving is particularly advantageous in circumstances where the first converter station is located offshore since the space provided by an offshore platform to support such a first converter station is at an absolute premium.

Preferably a single one of the first, second, third and fourth digital controllers runs the active instances of the first converter station and master power control functions.

Utilising a single digital controller to run both the active instance of the first converter station control function and the active instance of the master power control function is advantageous because it reduces the complexity of providing operational data, e.g. as outputted by the first and second converter control functions, to the active instances of the first converter station and master power control functions, and thereby reduces the need for additional interconnecting hardware along with the attendant increased cost and space requirement.

Optionally the first digital controller runs the active instances of the first converter station and master power control functions.

Running the active instances of the first converter station and master power control functions on the first digital controller, which also runs the active instance of the first converter control function, is desirable because in the event of the first digital controller failing, it and all of the corresponding active instances can be discarded in a straightforward manner, rather than there being a need to determine which of multiple active instances on different digital controllers should take precedence, and reliance instead placed on, e.g. respective back up instances.

In a preferred embodiment of the invention one of the first, second, third and fourth digital controllers additionally runs a standby instance of the first converter station control function, and one of the first, second, third and fourth digital controllers additionally runs a standby instance of the master power control function.

Implementing a standby instance of the first converter station and master power control functions on one more of the digital controllers desirably provides a degree of redundancy for the first converter station control function and the master power control function, while avoiding the deployment of additional controller hardware within the first converter station, e.g. the use of further digital controllers, to run such functions, and thereby provides operators of the transmission scheme with further redundancy comfort without adversely impacting on the size of the first converter station.

A single one of the first, second, third and fourth digital controllers may run the standby instances of the first converter station and master power control functions.

Utilising a single digital controller to run both the standby instance of the first converter station control function and the standby instance of the master power control function beneficially reduces the complexity of providing operational data, e.g. as outputted by the first and second converter control functions, to the standby instances of the first converter station and master power control functions, and thereby reduces the need for additional interconnecting hardware along with the attendant increased cost and space requirement.

In another preferred embodiment of the invention the third digital controller runs the standby instances of the first converter station and master power control functions.

Running the standby instances of the first converter station and master power control functions on the third digital controller, which also runs the active instance of the second converter control function, is desirable because switching the third digital controller to run all active instances, i.e. in the event of the standby instances of the first converter station and master power control functions being needed to replace failed active instances of those control functions, is straightforward and avoids complexity, e.g. in providing operational data to the newly promoted standby instances of the first converter station and master power control functions.

Preferably the digital controller running the standby instance of the first converter station control function is different to the digital controller running the active instance of the first converter station control function, and the digital controller running the standby instance of the master power control function is different to the digital controller running the active instance of the master power control function.

Utilising different digital controllers to run the active and standby instances of the respective first converter station control function and master power control function advantageously means that a problem with one digital controller does not prevent the running of another, e.g. standby, i.e. back up, instance of a control function, and so avoids a single point of a failure disabling both the active and standby instances of such a given control function and thus negating the redundancy otherwise provided.

Optionally one of the first, second, third and fourth digital controllers additionally runs a first deep standby instance of the first converter station control function, and one of the first, second, third and fourth digital controllers additionally runs a first deep standby instance of the master power control function.

Implementing a first deep standby instance of the first converter station and master power control functions on one more of the digital controllers desirably provides an additional degree of redundancy for the first converter station control function and the master power control function, while nevertheless continuing to avoid the deployment of additional controller hardware within the first converter station, e.g. the use of further digital controllers, to run such functions. As a consequence a still further degree of redundancy comfort is provided to operators of the transmission scheme without any increase in size of the first converter station.

A single one of the first, second, third and fourth digital controllers may run the first deep standby instances of the first converter station and master power control functions.

Utilising a single digital controller to run both the first deep standby instances of the first converter station control function and the master power control function usefully makes use of the available capacity within such a digital controller to run further controller functions, while nevertheless providing the desired additional degree of redundancy.

Preferably the second digital controller runs the first deep standby instances of the first converter station and master power control functions.

Running the first deep standby instances of the first converter station and master power control functions on the second digital controller, which also runs the standby instance of the first converter control function, is desirable because it usefully makes use of the available capacity within the second digital controller to run further controller functions, while nevertheless providing the desired additional degree of redundancy.

In a still further preferred embodiment of the invention the digital controller running the first deep standby instance of the first converter station control function is different to the digital controller running the active instance of the first converter station control function and the digital controller running the standby instance of the first converter station control function, and the digital controller running the first deep standby instance of the master power control function is different to the digital controller running the active instance of the master power control function and the digital controller running the standby instance of the master power control function.

Utilising different digital controllers to run the active, standby and first deep standby instances of the respective first converter station control function and master power control function beneficially means that each instance is able to be run independently of the others, such that in the event of, e.g. one digital controller failure neither of the other instances is affected, so one or other of them can be run as a back up to the instance no longer running on the, e.g. failed digital controller. Hence operators of the transmission scheme are ensured of multiple layers of redundancy without any increase in size of the first converter station, i.e. a normal active instance which runs ordinarily, a first back up layer in the form of a standby instance that can be called upon in the event of an anomaly or other error with the active instance, and a second back up layer in the form of a first deep standby instance that can be utilised in the unlikely event of a problem with the standby instance.

Preferably one of the first, second, third and fourth digital controllers additionally runs a second deep standby instance of the first converter station control function, and one of the first, second, third and fourth digital controllers additionally runs a second deep standby instance of the master power control function.

Implementing a second deep standby instance of the first converter station and master power control functions on one more of the digital controllers provides a still further additional degree of redundancy for the first converter station control function and the master power control function, while nevertheless still continuing to avoid the deployment of additional controller hardware within the first converter station and any associated increase in size of the first converter station.

Optionally a single one of the first, second, third and fourth digital controllers runs the second deep standby instances of the first converter station and master power control functions.

Utilising a single digital controller to run both the second deep standby instances of the first converter station control function and the master power control function similarly reduces the complexity of providing operational data, e.g. as outputted by the first and second converter control functions, to the first deep standby instances of the first converter station and master power control functions usefully makes use of the available capacity within such a digital controller to run further controller functions, while nevertheless providing the desired additional degree of redundancy.

The fourth digital controller may run the second deep standby instances of the first converter station and master power control functions.

Running the second deep standby instances of the first converter station and master power control functions on the fourth digital controller, which also runs the standby instance of the second converter control function, is desirable because it usefully makes use of the available capacity within the fourth digital controller to run further controller functions, while nevertheless providing the desired additional degree of redundancy.

In another preferred embodiment of the invention:
the digital controller running the second deep standby instance of the first converter station control function is different to the digital controller running the active instance of the first converter station control function, the digital controller running the standby instance of the first converter station control function, and the digital controller running the first deep standby instance of the first converter station control function; and
the digital controller running the second deep standby instance of the master power control function is different to the digital controller running the active instance of the master power control function, the digital controller running the standby instance of the master power control function, and the digital controller running the first deep standby instance of the master power control function.

Utilising different digital controllers to run the active, standby, first deep standby, and second deep standby instances of the respective first converter station control function and master power control function is similarly advantageous because it means that each instance is able to be run independently of the others, such that each is able to provide an independent back up to the others.

According to a second aspect of the invention there is provided a method of operating a bipole power transmission scheme comprising at least a first converter station positioned in-use separate from at least a second converter station, and at least first and second transmission conduits and a first return conduit to in-use interconnect the first converter station with the second converter station and thereby permit the transfer of power between the first and second converter stations,
the first converter station including:
a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
a first digital controller running an active instance of the first converter control function;
a second digital controller running a standby instance of the first converter control function;
a third digital controller running an active instance of the second converter control function; and
a fourth digital controller running a standby instance of the second converter control function,
the method of the invention comprising the steps of:
(a) additionally running an active instance of a first converter station control function which generates station control data to control operation of the first converter station on one of the first, second, third or fourth digital controllers, and
(b) additionally running an active instance of a master power control function which in-use generates power control data to in-use control the power exchanged by the first converter station on one of the first, second, third or fourth digital controllers.

The method of the invention shares the benefits of the corresponding features of the bipole power transmission scheme of the invention.

It will be appreciated that the use of the terms "first" and "second", and the like, in this patent specification is merely intended to help distinguish between similar features (e.g., the first and second transmission conduits, and the first and second power converters), and is not intended to indicate the relative importance of one feature over another feature, unless otherwise specified.

Within the scope of this application, it is expressly intended that the various aspects, embodiments, examples, and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
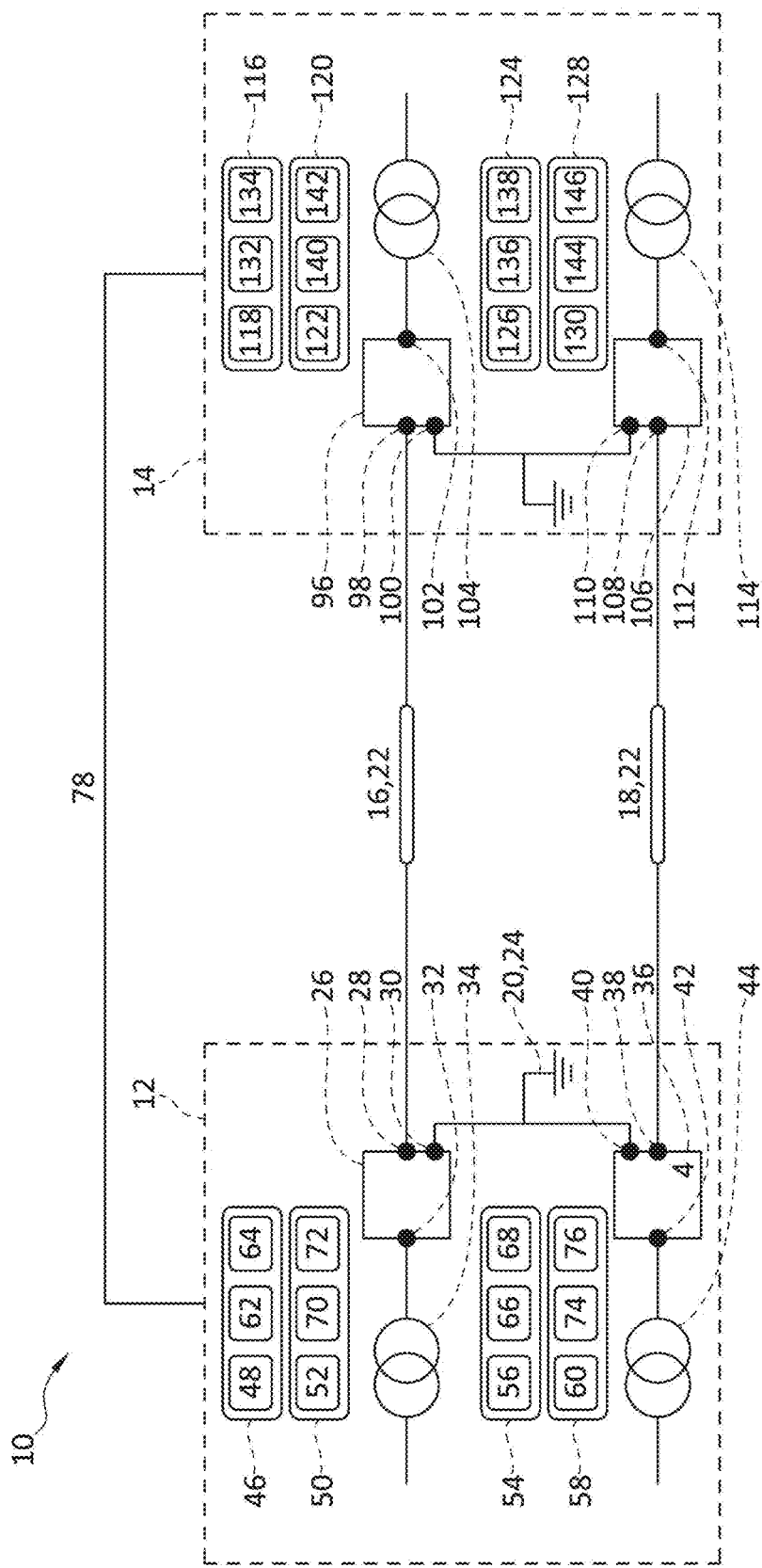
FIG. 1 shows a schematic view of a bipole power transmission scheme having a two terminal configuration according to a first embodiment of the invention.

A bipole power transmission scheme according to a first embodiment of the invention is designated generally by reference numeral 10, as shown in FIG. 1.

The bipole power transmission scheme 10, i.e., bipole power transmission network, includes first and second converter stations 12, 14 that are positioned separately from one another.

The first and second converter stations 12, 14 are interconnected by first and second transmission conduits 16, 18, i.e., first and second 'poles' (hence the scheme constituting a 'bipole' scheme, and more particularly a 'two terminal bipole' scheme), as well as a first return conduit 20, to permit the transfer of power between the first and second converter stations 12, 14.

Each of the first and second transmission conduits 16, 18 is or includes an overhead line 22, although in other embodiments of the invention one or other transmission conduit might be, or include an underground cable, a subsea cable, or a mixture of such cables and line. Additionally, the first return conduit 20 is or includes an earth return 24, although a dedicated electrical conductor, e.g., a dedicated metallic return, may be used instead.

Moreover, in the embodiment shown the bipole power transmission scheme 10 of the invention includes both the first and second converter stations 12, 14, but other embodiments of the invention may include only the first converter station 12. Such other embodiments of the invention may be applicable when a third party owns or manages the second converter station and the downstream power transmission network associated therewith, and it is intended for the bipole power transmission scheme of the invention to interoperate with such a second converter station and associated power transmission network.

Returning to the embodiment shown, the first converter station 12 includes a first power converter 26 which has a first DC terminal 28 that is connected with the first transmission conduit 16, a second DC terminal 30 that is connected with the first return conduit 20, i.e. the earth return 24, and three first AC terminals 32 (only one of which is shown for simplicity) which, in use, are connected with a first, three-phase AC network element 34 such as, e.g. a first three-phase AC power supply. Other embodiments of the invention may have fewer than or more than three first AC terminals depending on the number of phases utilised by the first AC network element.

The first converter station 12 also includes a second power converter 36 that has a third DC terminal 38 which is connected with the first return conduit 20, a fourth DC terminal 40 which is connected with the second transmission conduit 18, and three second AC terminals 42 (although this can again vary in other embodiments of the invention) that, in use, are connected with a second, three-phase AC network element 44 such as, e.g. a second three-phase AC power supply.

Operation of the first power converter 26 to transfer power between the first transmission conduit 16 and the first AC network element 34 is controlled by a first converter control function, while operation of the second power converter 36 to transfer power between the second transmission conduit 18 and the second AC network element 44 is controlled by a second converter control function.

In that regard, the first converter station 12 also includes a first digital controller 46 that is running an active instance of the first converter control function 48, i.e., is running a version of the first converter control function that under normal conditions is in control of the operation of the first power converter 26.

The first converter station 12 also includes a second digital controller 50 which is running a standby instance of the first converter control function 52. The standby instance of the first converter control function 52, while always running on the second digital controller 50 does not normally control operation of the first power converter 26, that being taken care of by the active instance of the first converter control function 48 which is running of the first digital controller 46. However, the standby instance of the first converter control function 52 is immediately ready to take over control of the first power converter 26, e.g. in the event of a problem with the running of the active instance of the first converter control function 48.

Additionally, the first converter station 12 also includes a third digital controller 54 that is running an active instance of the second converter control function 56, i.e., is running a version of the second converter control function that under normal conditions is in control of the operation of the second power converter 36.

The first converter station 12 also includes a fourth digital controller 58 which is running a standby instance of the second converter control function 60. Again, similarly, the standby instance of the second converter control function 60, while always running on the fourth digital controller 58 does not normally control operation of the second power converter 36, that being taken care of by the active instance of the second converter control function 56 which is running of the third digital controller 54. However, as above, the standby instance of the second converter control function 60 is immediately ready to take over control of the second power converter 36, e.g. similarly in the event of a problem with the running of the active instance of the second converter control function 56.

The first, second, third and fourth digital controllers 46, 50, 54, 58 are part of a digital control system that is a combination of a modular hardware platform and associated application software which has a compact footprint.

In addition to the foregoing, one of the first, second, third and fourth digital controllers 46, 50, 54, 58 additionally runs an active instance of a first converter station control function 62. Such a first converter station control function, in use, generates station control data to control operation of the first converter station 12, while the aforementioned active instance of the first converter station control function 62 is the version of the second converter control function that under normal conditions is in control of the first converter station 12.

One of the first, second, third and fourth digital controllers 46, 50, 54, 58 also additionally runs an active instance of a master power control function 64 which, in-use, generates power control data to control the power exchanged by the first converter station 12, i.e., the power the first converter station 12 exchanges with the second converter station 14. Such an active instance again, similarly, is the version of the master power control function that under normal conditions is in control of the overall power exchanged by the first converter station 12 with the second converter station 14.

More particularly, a single one of the first, second, third and fourth digital controllers 46, 50, 54, 58 runs the active instances of the first converter station and master power control functions 62, 64, and more particularly still in the embodiment shown the first digital controller 46 runs the said active instances of the first converter station and master power control functions 62, 64. In other embodiments of the invention (not shown) such active instances may be run by one or more of the other digital controllers.

Furthermore, one of the first, second, third and fourth digital controllers 46, 50, 54, 58 additionally runs a standby instance of the first converter station control function 66, and one of the first, second, third and fourth digital controllers 46, 50, 54, 58 additionally runs a standby instance of the master power control function 68.

Such standby instances of the first converter station control function 66 and the master power control function 68, while similarly always running, do not normally control the associated operation of the first converter station 12, such control being taken care of by the active instances of those control functions 62, 64. However, as above, each of the standby instance of the first converter station control function 66 and the standby instance of the master power control function 68 is immediately ready to take over the associated control of the first converter station 12 from the corresponding active instance of the first converter station and master power control functions 62, 64, e.g. in the event of a problem with the running of either such active instances 62, 64.

More particularly, a single one of the first, second, third and fourth digital controllers 46, 50, 54, 58 runs the standby instances of the first converter station and master power control functions 66, 68, and more particularly still the third digital controller 54 runs the standby instances of the first converter station and master power control functions 66, 68. In other embodiments of the invention (not shown) such standby instances may be run by one or more of the other digital controllers.

In any event, the digital controller running the standby instances of the first converter station control function 66 and the master power control function 68, i.e., the third digital controller 54, is different to the digital controller running the active instances of the first converter station control function 62 and the master power control function 64, i.e. is different to the first digital controller 46.

Further to the above, one of the first, second, third and fourth digital controllers 46, 50, 54, 58 additionally runs a first deep standby instance of the first converter station control function 70, and one of the first, second, third or fourth digital controllers 46, 50, 54, 58 additionally runs a first deep standby instance of the master power control function 72.

More particularly, a single one of the first, second, third and fourth digital controllers 46, 50, 54, 58 runs the first deep standby instances of the first converter station and master power control functions 70, 72, and more particularly still the second digital controller 50 runs the first deep standby instances of the first converter station and master power control functions 70, 72. In other embodiments of the invention (not shown) such first deep standby instances may be run by one or more of the other digital controllers.

In any event, while the first deep standby instances of the first converter station control function 70 and the master power control function 72, are always running, they do not normally control the associated operation of the first converter station 12, such normal control being taken care of by the active instances of those control functions 62, 64.

Moreover, nor will either of the first deep standby instances of the first converter station and master power control functions 70, 72 ordinarily take over from the corresponding active instances of those control functions 62, 64 in the event of a problem with either of those active instances 62, 64. Rather, as set out above, the corresponding standby instance of the first converter station control function and the master power control function 66, 68 is immediately ready to take over the associated control of the first converter station 12 from the corresponding active instance of the first converter station and master power control functions 62, 64.

Instead, each of the first deep standby instance of the first converter station control function 70 and the first deep standby instance of the master power control function 72 is immediately ready to take over the associated control of the first converter station 12 from the corresponding standby instance of the first converter station and master power control functions 66, 68, e.g. in the event of a problem first of all with the running of either of the active instances of those functions 62, 64, and then a subsequent problem secondly with the running of a corresponding one of the standby instances of the first converter station and master power control functions 66, 68. In other words, by way of example, the first deep standby instance of the first converter station control function 70 only takes over the associated control of the first converter station 12 in the event, firstly, of there being a problem running the active instance of the first converter station control function 62 and then, secondly, there being a problem with the running of the standby instance of the first converter control function 66.

The digital controller, i.e. the second digital controller 50, running the first deep standby instances of the first converter station and the master power control functions 70, 72 is different to the digital controller, i.e., the first digital controller 46 running the active instances of the first converter station and the master power control functions 62, 64, and to the digital controller, i.e., the third digital controller 54, running the standby instances of the first converter station and the master power control functions 66, 68.

Finally in relation to the first converter station 12, one of the first, second, third and fourth digital controllers 46, 50, 54, 58 additionally runs a second deep standby instance of the first converter station control function 74, and one of the first, second, third or fourth digital controllers 46, 50, 54, 58 additionally runs a second deep standby instance of the master power control function 76.

More particularly, a single one of the first, second, third and fourth digital controllers 46, 50, 54, 58 runs the second deep standby instances of the first converter station and master power control functions 74, 76, and more particularly still the fourth digital controller 58 runs the second deep standby instances of the first converter station and master power control functions 74, 76.

Although always running, neither the second deep standby instance of the first converter station control function 74 nor the second deep standby instance of the master power control function 76 is normally in associated control of the first converter station 12. Each such second deep standby instance 74, 76 is, however, immediately ready to take over the associated control of the first converter station 12 from the corresponding first deep standby instance of the first converter station and master power control functions 70, 72, e.g. in the event of a problem with the running of either of the first deep standby instances of the first converter station and master power control functions 70, 72 (i.e. following a problem with the running of either of the active instances of those functions 62, 64, and then a subsequent problem with the running of a corresponding one of the standby instances of the first converter station and master power control functions 66, 68).

In the foregoing manner, the digital controller, i.e. the fourth digital controller 58, running the second deep standby instances of the first converter station and master power control functions 74, 76 is different to the digital controller, i.e. the first digital controller 46, running the active instances of the first converter station and master power control functions 62, 64, different to the digital controller, i.e. third digital controller 54, running the standby instances of the first converter station and master power control functions 66, 68, and different to the digital controller, i.e. the second digital controller 50, running the first deep standby instances of the first converter station and master power control functions 70, 72.

Meanwhile, the second converter station 14 includes a third power converter 96 which has a fifth DC terminal 98 that is connected with the first transmission conduit 16, a sixth DC terminal 100 that is connected with the first return conduit 20, and three third AC terminals 102 (although this can differ in other embodiments) which, in use, are connected with a third, three-phase AC network element 104 such as, e.g. a first AC distribution network.

The second converter station 14 also includes a fourth power converter 106 that has a seventh DC terminal 108 which is connected with the first return conduit 20, an eighth DC terminal 110 which is connected with the second transmission conduit 18, and three fourth AC terminals 112 (although, again, this can vary in other embodiments) that, in use, are connected with a fourth, three-phase AC network element 114 such as, e.g. a second AC distribution network.

Operation of the third power converter 96 to transfer power between the first transmission conduit 16 and the third AC network element 104 is controlled by a third converter control function, while operation of the fourth power converter 106 to transfer power between the second transmission conduit 18 and the fourth AC network element 114 is controlled by a fourth converter control function.

In a similar, albeit mirrored, configuration to the first converter station 12, the second converter station 14 includes a fifth digital controller 116 that is running an active instance of the third converter control function 48, i.e., is running a version of the third converter control function that under normal conditions is in control of the operation of the third power converter 96.

The second converter station 14 also includes a sixth digital controller 120 which is running a standby instance of the third converter control function 52, a seventh digital controller 124 that is running an active instance of the fourth converter control function 126 (i.e., is running a version of the fourth converter control function that under normal conditions is in control of the operation of the fourth power converter 106), and an eighth digital controller 128 which is running a standby instance of the fourth converter control function 130.

The fifth, sixth, seventh and eighth digital controllers 116, 120, 124, 128 are similarly part of another digital control system.

The fifth digital controller 116 additionally runs an active instance of a second converter station control function 132 which, in use, generates station control data to control operation of the second converter station 14, as well as running an active instance of another master power control function 134 which, in-use, generates power control data to control the power exchanged by the second converter station 14, i.e., the power the second converter station 14 exchanges with the first converter station 12. In this latter regard the active instance of the master control function 64 running on the first digital controller 46 within the first converter station 12 and the active instance of the other master control function 134 running on the fifth digital controller 116 within the second converter station 14 auto-negotiate a leader-follower arrangement, e.g. via a telecoms link 78 between the first and second converter stations 12, 14. The leader-follower arrangement can also, optionally, be changed by an operator command.

Additionally, the seventh digital controller 124 runs a standby instance of the second converter station control function 136, and a standby instance of the other master power control function 138.

Further to the above, the sixth digital controller 120 additionally runs a first deep standby instance of the second converter station control function 140, and a first deep standby instance of the other master power control function 142.

Finally in relation to the second converter station 14, eighth digital controller 128 runs a second deep standby instance of the second converter station control function 144, and a second deep standby instance of the other master power control function 146.

With respect to the second converter station 14, the standby, first deep standby, and second deep standby instances of the various control functions 122, 130, 136, 138, 140, 142, 144, 146 operate in a similar cascading manner to provide the same degrees of redundancy as the corresponding instances of the various control functions 52, 60, 66, 68, 70, 72, 74, 76 of the first converter station 12.

Additionally, the principle of using a set of four digital controllers per pair of power converters, with the set of digital controllers running the combination of active, standby, first deep standby, and second deep standby instances of the various required control functions described hereinabove, can be extended to more complex bipole power transmission schemes.

Figure 2:
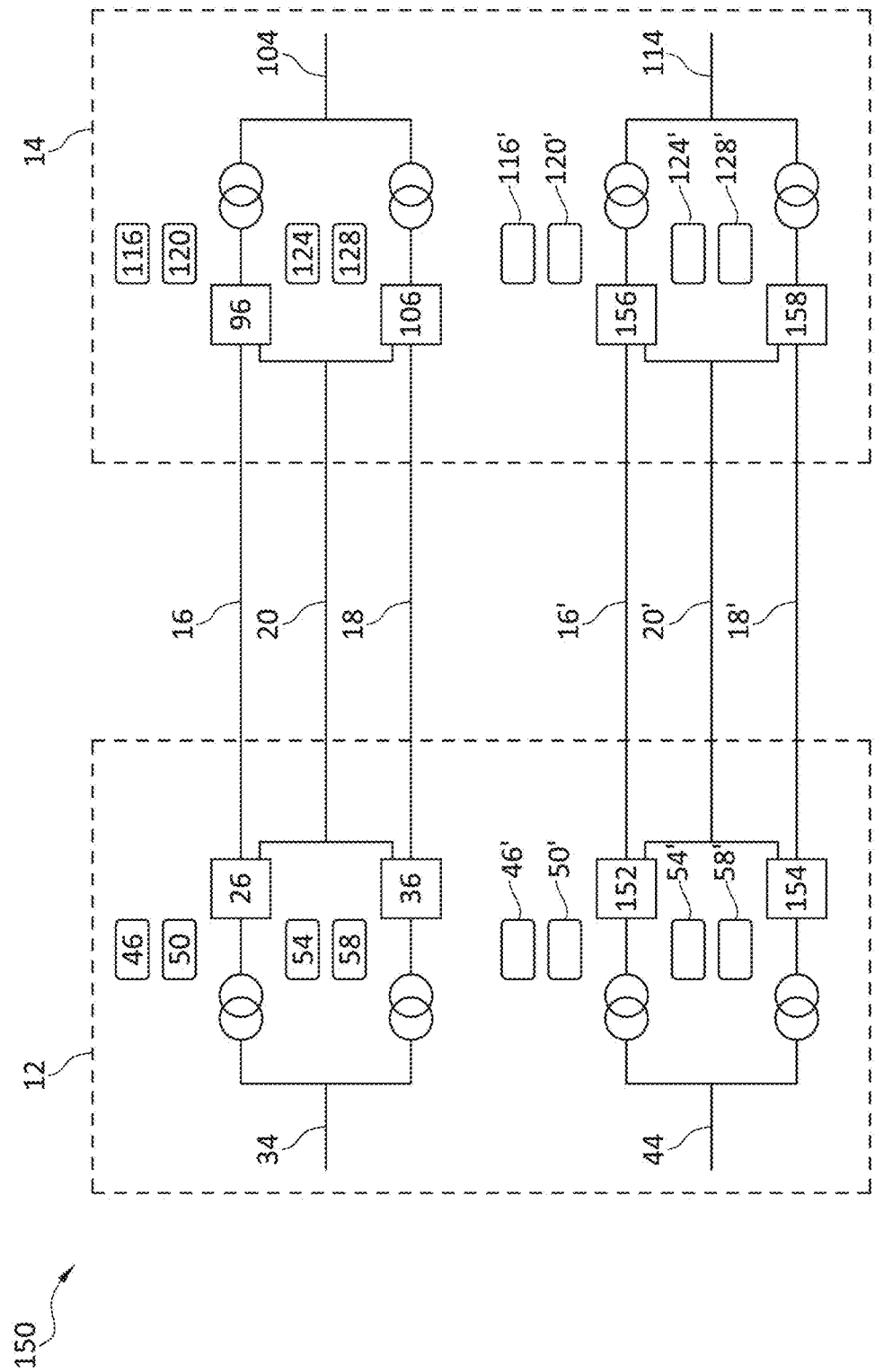
FIG. 2 shows a schematic view of a bipole power transmission scheme having a two terminal dual configuration, i.e., a parallel bipole, according to a second embodiment of the invention.

For example, as shown in FIG. 2, a bipole power transmission scheme 150 according to a second embodiment of the invention, having a two terminal dual configuration, i.e., a parallel bipole configuration, comprising first and second converter stations 12, 14 but further including fifth, sixth, seventh and eighth power converters 152, 154, 156, 158 interconnected by corresponding transmission conduits 16', 18' and return conduit 20', can similarly have a first additional set of four corresponding digital controllers 46', 50', 54', 58' to control the fifth and sixth power converters 152, 154, as well as a second additional set of four corresponding digital controllers 116', 120', 124', 128' to control the seventh and eight power converters 156, 158.

Figure 3:
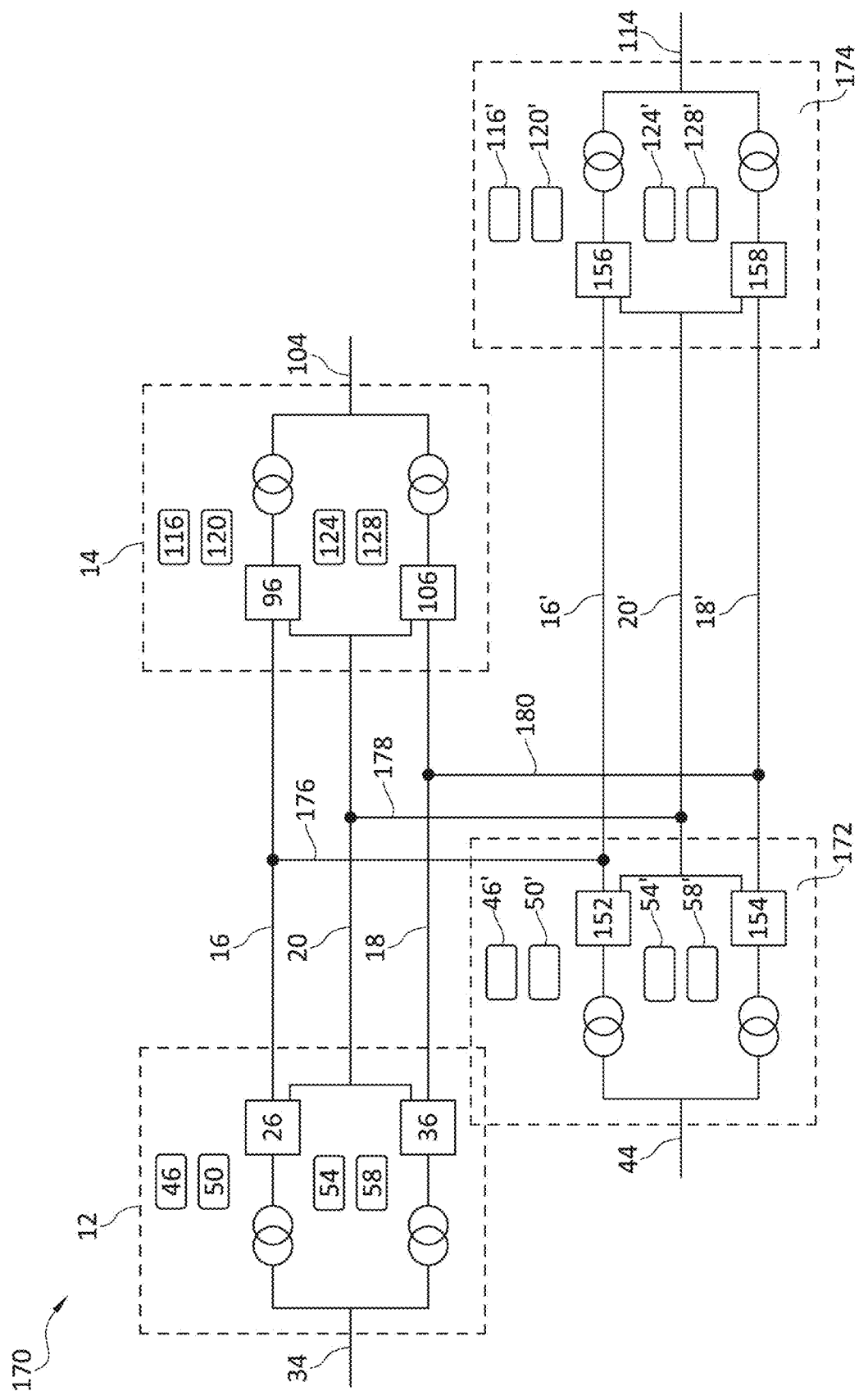
FIG. 3 shows a schematic view of a bipole power transmission scheme having a four terminal configuration according to a third embodiment of the invention.

Also for example, as shown in FIG. 3, a bipole power transmission scheme 170 according to a third embodiment of the invention having a four terminal configuration, additionally comprising third and fourth converter stations 172, 174, the third converter station 172 including fifth and sixth power converters 152, 154 and the fourth converter station 174 including seventh and eighth power converters 156, 158, the third and fourth converter stations 172, 174 similarly being interconnected by corresponding transmission conduits 16', 18' and return conduit 20', and each of which is in turn interconnected with first and second transmission conduits 16, 18 and a return conduit 20 by respective interconnecting conduits 176, 178, 180, can likewise similarly have a first additional set of four corresponding digital controllers 46', 50', 54', 58' to control the fifth and sixth power converters 152, 154, as well as a second additional set of four corresponding digital controllers 116', 120', 124', 128' to control the seventh and eight power converters 156, 158.

We claim:

1. A bipole power transmission scheme, comprising:
at least a first converter station positioned in-use separate from at least a second converter station, and at least first and second transmission conduits and a first return conduit to in-use interconnect the first converter station with the second converter station and thereby permit the transfer of power between the first and second converter stations,
the first converter station including:
a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
a first digital controller running an active instance of the first converter control function;
a second digital controller running a standby instance of the first converter control function;
a third digital controller running an active instance of the second converter control function; and
a fourth digital controller running a standby instance of the second converter control function,
one of the first, second, third and fourth digital controllers additionally running an active instance of a first converter station control function which generates station control data to control operation of the first converter station, and
one of the first, second, third and fourth digital controllers additionally running an active instance of a master power control function which in-use generates power control data to in-use control the power exchanged by the first converter station.

2. A bipole power transmission scheme according to claim 1, wherein a single one of the first, second, third and fourth digital controllers runs the active instances of the first converter station and master power control functions.

3. A bipole power transmission scheme according to claim 2, wherein the first digital controller runs the active instances of the first converter station and master power control functions.

4. A bipole power transmission scheme according to claim 1, wherein one of the first, second, third and fourth digital controllers additionally runs a standby instance of the first converter station control function, and one of the first, second, third and fourth digital controllers additionally runs a standby instance of the master power control function.

5. A bipole power transmission scheme according to claim 4, wherein a single one of the first, second, third and fourth digital controllers runs the standby instances of the first converter station and master power control functions.

6. A bipole power transmission scheme according to claim 5, wherein the third digital controller runs the standby instances of the first converter station and master power control functions.

7. A bipole power transmission scheme according to claim 4, wherein the digital controller running the standby instance of the first converter station control function is different to the digital controller running the active instance of the first converter station control function, and the digital controller running the standby instance of the master power control function is different to the digital controller running the active instance of the master power control function.

8. A bipole power transmission scheme according to claim 1, wherein one of the first, second, third and fourth digital controllers additionally runs a first deep standby instance of the first converter station control function, and one of the first, second, third and fourth digital controllers additionally runs a first deep standby instance of the master power control function.

9. A bipole power transmission scheme according to claim 8, wherein a single one of the first, second, third and fourth digital controllers runs the first deep standby instances of the first converter station and master power control functions.

10. A bipole power transmission scheme according to claim 9, wherein the second digital controller runs the first deep standby instances of the first converter station and master power control functions.

11. A bipole power transmission scheme according to claim 8, wherein the digital controller running the first deep standby instance of the first converter station control function is different to the digital controller running the active instance of the first converter station control function and the digital controller running the standby instance of the first converter station control function, and the digital controller running the first deep standby instance of the master power control function is different to the digital controller running the active instance of the master power control function and the digital controller running the standby instance of the master power control function.

12. A bipole power transmission scheme according to claim 1, wherein one of the first, second, third and fourth digital controllers additionally runs a second deep standby instance of the first converter station control function, and one of the first, second, third and fourth digital controllers additionally runs a second deep standby instance of the master power control function.

13. A bipole power transmission scheme according to claim 12, wherein a single one of the first, second, third and fourth digital controllers runs the second deep standby instances of the first converter station and master power control functions.

14. A bipole power transmission scheme according to claim 13, wherein the fourth digital controller runs the second deep standby instances of the first converter station and master power control functions.

15. A bipole power transmission scheme according to claim 12, wherein:
the digital controller running the second deep standby instance of the first converter station control function is different to the digital controller running the active instance of the first converter station control function, the digital controller running the standby instance of the first converter station control function, and the digital controller running the first deep standby instance of the first converter station control function; and
the digital controller running the second deep standby instance of the master power control function is different to the digital controller running the active instance of the master power control function, the digital controller running the standby instance of the master power control function, and the digital controller running the first deep standby instance of the master power control function.

16. A method of operating a bipole power transmission scheme, comprising:
at least a first converter station positioned in-use separate from at least a second converter station, and at least first and second transmission conduits and a first return conduit to in-use interconnect the first converter station with the second converter station and thereby permit the transfer of power between the first and second converter stations,
the first converter station including:
a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
a first digital controller running an active instance of the first converter control function;
a second digital controller running a standby instance of the first converter control function;
a third digital controller running an active instance of the second converter control function; and
a fourth digital controller running a standby instance of the second converter control function,
the method of the invention comprising the steps of:
(a) additionally running an active instance of a first converter station control function which generates station control data to control operation of the first converter station on one of the first, second, third or fourth digital controllers, and
(b) additionally running an active instance of a master power control function which in-use generates power control data to in-use control the power exchanged by the first converter station on one of the first, second, third or fourth digital controllers.

* * * * *